US009001651B2

(12) United States Patent  
Pacella (10) Patent No.: US 9,001,651 B2
(45) Date of Patent: Apr. 7, 2015

(54) METHOD FOR CALL ADMISSION CONTROL IN MPLS NETWORKS

(75) Inventor: Dante J. Pacella, Charles Town, WV (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 72 days.

(21) Appl. No.: 13/366,452

(22) Filed: Feb. 6, 2012

(65) Prior Publication Data

US 2013/0201829 A1  Aug. 8, 2013

(51) Int. Cl.
*H04L 12/701* (2013.01)
*H04L 12/723* (2013.01)
*H04L 12/721* (2013.01)
*H04L 12/717* (2013.01)

(52) U.S. Cl.
CPC ............. *H04L 45/50* (2013.01); *H04L 45/44* (2013.01); *H04L 45/42* (2013.01)

(58) Field of Classification Search
CPC ... H04L 12/569; H04L 12/5695; H04L 45/38; H04L 29/06; H04L 45/02; H04L 47/10; H04L 47/70; H04L 41/08; H04L 45/44; H04L 45/50; H04L 45/42
USPC ............. 370/230, 230.1, 232, 234, 235, 236, 370/237, 238, 252, 253, 254, 255, 400, 410, 370/411
See application file for complete search history.

(56) References Cited

U.S. PATENT DOCUMENTS

| | | | |
|---|---|---|---|
| 6,363,319 B1 * | 3/2002 | Hsu ................................ | 701/533 |
| 6,636,512 B1 * | 10/2003 | Lorrain et al. ................ | 370/392 |
| 6,944,675 B2 * | 9/2005 | Fujita ............................ | 709/240 |
| 6,973,033 B1 * | 12/2005 | Chiu et al. ................... | 370/230.1 |
| 7,047,311 B2 * | 5/2006 | Oishi et al. ..................... | 709/233 |
| 7,260,060 B1 * | 8/2007 | Abaye et al. .................... | 370/230 |
| 7,336,605 B2 * | 2/2008 | Bruckman et al. ............. | 370/230 |
| 7,580,359 B2 * | 8/2009 | Pirbhai .......................... | 370/237 |
| 7,698,366 B2 * | 4/2010 | Schofield et al. .............. | 709/205 |
| 7,792,025 B2 * | 9/2010 | Segel et al. .................... | 370/230 |
| 8,094,575 B1 * | 1/2012 | Vadlakonda et al. .......... | 370/252 |
| 8,489,720 B1 * | 7/2013 | Morford et al. ................ | 709/223 |
| 8,891,519 B2 * | 11/2014 | DelRegno et al. ............. | 370/389 |
| 8,898,262 B2 * | 11/2014 | Andries et al. ................ | 709/220 |
| 2002/0141343 A1 * | 10/2002 | Bays .............................. | 370/235 |

(Continued)

FOREIGN PATENT DOCUMENTS

WO      WO 03/058868      *  7/2003

OTHER PUBLICATIONS

Gu et al., "Policies and dynamic information migration in DC", Jun. 12, 2011, IETF Network Working Group, Huawei/China Telecom, draft-gu-opsa-policies-migration-00.*

*Primary Examiner* — Paul H Masur
*Assistant Examiner* — Michael Phillips (57) ABSTRACT

A computing device collects network topology information for a Multiprotocol Label Switching (MPLS) network that includes multiple data centers. The computing device receives, from a service layer operator, a request including a flow demand for services at a selected data center of the multiple data centers. Based on the collected network topology information, the computing device evaluates the flow demand for the selected data center to determine if the selected data center can support the flow demand and sends, to a network layer operator, a network soft-state to support the flow demand at the selected data center when it is determined that the selected data center can support the flow demand.

20 Claims, 10 Drawing Sheets

(56) References Cited

U.S. PATENT DOCUMENTS

| | | |
|---|---|---|
| 2003/0058798 A1* | 3/2003 | Fleischer et al. .............. 370/238 |
| 2004/0208511 A1* | 10/2004 | Peddanarappagari et al. .. 398/25 |
| 2004/0228278 A1* | 11/2004 | Bruckman et al. ............ 370/231 |
| 2005/0074529 A1* | 4/2005 | Cohen et al. .................. 426/106 |
| 2006/0002297 A1* | 1/2006 | Sand et al. .................... 370/235 |
| 2006/0133300 A1* | 6/2006 | Lee et al. ...................... 370/254 |
| 2006/0171397 A1* | 8/2006 | Watkinson ................. 370/395.2 |
| 2007/0118643 A1* | 5/2007 | Mishra et al. ................. 709/224 |
| 2007/0147346 A1* | 6/2007 | Gilmartin ...................... 370/352 |
| 2007/0177604 A1* | 8/2007 | Ozawa et al. .............. 370/395.2 |
| 2008/0013531 A1* | 1/2008 | Elliott et al. .................. 370/356 |
| 2008/0049614 A1* | 2/2008 | Briscoe et al. ................ 370/230 |
| 2008/0219268 A1* | 9/2008 | Dennison ................... 370/395.2 |
| 2008/0225709 A1* | 9/2008 | Lange ........................... 370/230 |
| 2009/0059785 A1* | 3/2009 | Jogalekar et al. ............. 370/230 |
| 2009/0144393 A1* | 6/2009 | Kudo ............................ 709/218 |
| 2009/0304018 A1* | 12/2009 | Torger et al. .................. 370/431 |
| 2010/0039959 A1* | 2/2010 | Gilmartin ...................... 370/254 |
| 2010/0179987 A1* | 7/2010 | Sebastian et al. ............. 709/203 |
| 2011/0317703 A1* | 12/2011 | Dunbar et al. ................. 370/392 |
| 2012/0182865 A1* | 7/2012 | Andersen et al. ............. 370/228 |
| 2012/0233333 A1* | 9/2012 | Ganesan et al. ............... 709/227 |
| 2012/0239792 A1* | 9/2012 | Banerjee et al. .............. 709/223 |
| 2013/0010637 A1* | 1/2013 | Davison ........................ 370/254 |
| 2013/0185436 A1* | 7/2013 | Carlin et al. .................. 709/226 |

* cited by examiner

METHOD FOR CALL ADMISSION CONTROL IN MPLS NETWORKS

BACKGROUND

Multiprotocol Label Switching (MPLS) is an Internet Engineering Task Force (IETF)-specified framework that provides for the designation, routing, forwarding and switching of traffic flows through a network. Call admission control (CAC) may generally refer to regulating traffic volume networks, such as MPLS networks used for audio and video communications. Call admission control can also be used to ensure, or maintain, a certain level of quality in communications networks, or a certain level of performance in Internet nodes and servers where audio, video, and/or cloud computing service traffic exists.

DETAILED DESCRIPTION OF PREFERRED EMBODIMENTS

The following detailed description refers to the accompanying drawings. The same reference numbers in different drawings may identify the same or similar elements.

Systems and/or methods described herein may provide call admission control for the service of adding flows to data centers, such as a data center in a cloud-computing-based service or a content distribution network. In one implementation, a network device, referred to as a path computation element (PCE), may collect network topology information for a Multiprotocol Label Switching (MPLS) network that includes multiple data centers. The PCE may receive, from a service layer operator, a request including a flow demand for services at a selected data center. The flow demand request may include, for example, a flow size, an average packet size, quality of service (QoS) handling, an expected duration, Datagram Congestion Control Protocol (DCCP)-required services, and a list of locations. Based on the collected network topology information, the PCE may evaluate the flow demand applied to the selected data center to determine if the selected data center can support the flow demand. If it is determined that the selected data center can support the flow demand, the PCE may send, to a network layer operator, a network soft-state to support the flow demand at the selected data center. If it is determined that the selected data center cannot support the flow demand, the PCE may identify an alternate data center to support the flow demand.

As used herein, the term "operator" is intended to be broadly interpreted to include a user device (e.g., a computing device) or a user of a user device. Also as used herein, the term "flow" may refer to a sequence of packets sent from a particular source to a particular unicast or multicast destination that the source desires to label as a flow. For example, a flow could include all packets in a specific transport connection or a media stream.

Figure 1:
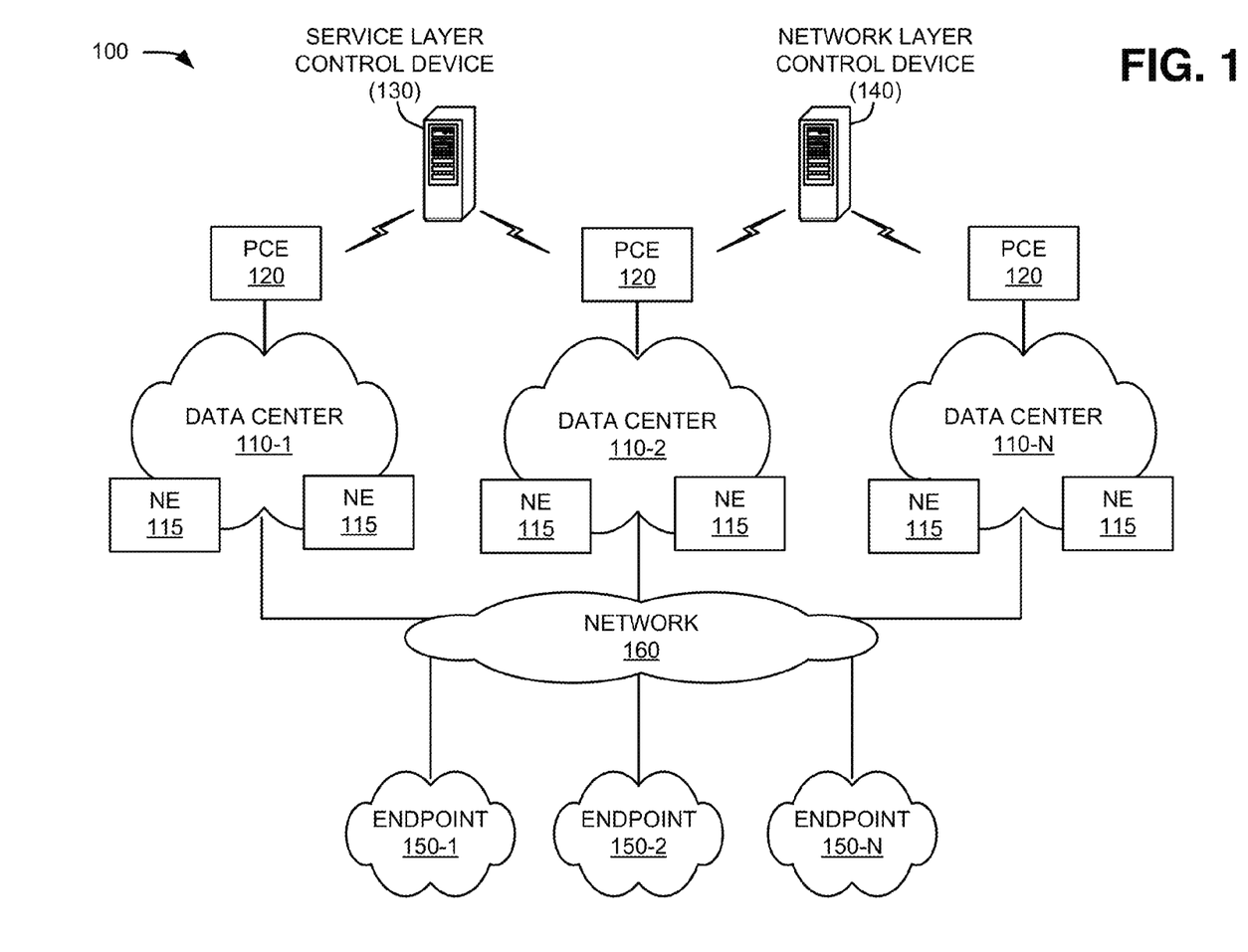
FIG. 1 is an illustration of a an exemplary network in which systems and/or methods described herein may be implemented.

FIG. 1 is an exemplary network 100 in which systems and/or methods described herein may be implemented. Network 100 may generally represent a cloud-computing-based network or a content distribution network. As illustrated, network 100 may include multiple data centers 110-1, 110-2, . . . 110-N (referred to herein generically as "data center 110" and collectively as "data centers 110") including multiple network elements (NE) 115; one or more PCEs 120; a service layer control device 130; a network layer control device 140; endpoints 150-1, 150-2, . . . 150-N (referred to herein generically as "endpoint 150" and collectively as "endpoints 150"); and network 160. Components of network 100 may be connected via wired and/or wireless links Data centers 110 may include a one or more network devices, or other types of computation or communication devices, to aggregate content and content metadata, process content, and/or distribute content. Data centers 110 may be implemented, for example, on a regional scale, where there may be data centers 110 located at particular major metropolitan regions of a country. In one implementation, data centers 110 may include a content delivery system to deliver digital content from a backend server to user devices. In another implementation, data centers 110 may operate to provide a cloud-based computing service to provide shared resources, software, and/or information.

Each data center 110 may include multiple network elements 115. Network elements 115 may include devices for performing network-related functions, such as a server, a router, or a switch (e.g., a provider edge (PE) router in a MPLS network). In one implementation, network elements 115 may work in tandem as a virtual machine to provide and/or relay content. Network elements 115 may also provide (e.g., to PCE 120 or a related network management station), event notifications that carry data specifying events that affect the network topology or capacity of network 100. Network elements 115 may communicate with other network elements 115 and/or PCEs 120 through a wired or wireless communication link. In one implementation, data centers 110 may load balance between network elements 115 depending on network element 115 resources, such as CPU capacity, memory, established sessions, new sessions, disk input/output, and network input/output. These load-balancing mechanisms may be implemented on a larger-scale to allow sessions or virtual machines to move within data centers 110 or between data centers 110.

PCE 120 may include one or more network devices, or other types of computation or communication devices, to compute a network path or route based on a network graph and applying computational constraints. PCE 120 may compute complex paths for a single service or a set of services. PCE 120 may be a network management station, part of a network element 115, or a dedicated computational platform that is aware of the network resources and has the ability to consider multiple constraints for sophisticated path computation. In one implementation, PCE 120 may receive event notifications from network elements 115. The event notifications may include Simple Network Management Protocol (SNMP) traps that are "pushed" asynchronously from a network element 115 to PCE 120 when a specific event occurs that affects the network topology or capacity of network 100. The event notifications may also include SNMP responses sent in response to polling by PCE 120. In one implementation, PCE 120 may compute label switched paths for MPLS traffic engineering.

As an example, in one implementation, PCE 120 may be implemented as a virtual machine. The virtual machine may be run on daughter cards within network elements 115 (e.g., one or more primary routers) and rely on event notifications within a routing subsystem to track the topology of network 100. The virtual machine may be isolated from the routing functions of network element 115 with strict caps on memory, storage, and/or management use to prevent disruption of routing functions. The virtual machine may have knowledge of the routing topology and protocols and may simulate the entire routing topology from within the virtual machine.

In implementations described herein, PCE 120 may include an interface to receive flow demand requests from, for example, a service operator (e.g., via service layer control device 130) to offload a flow or set of flows to a particular data center. PCE 120 may apply information in the flow demand request to determine if the particular data center can support the flow demand. In one implementation, PCE 120 may compute a soft-state for a flow demand or simulate the soft-state computation within its simulated topology. A soft-state may represent a calculated set of network resources available to support a flow or set flows.

Service layer control device 130 may include one or more network devices, or other types of computation or communication devices, to manage services provided via data centers 110. For example, service layer control device 130 may include monitoring mechanisms to provide load-balancing of services within data centers 110 and between data centers 110. In one implementation, service layer control device 130 may include an application program interface (API) with one or more PCEs 120. Via the APIs, service layer control device 130 may provide flow demand requests to PCE 120 to request network support for particular services. The flow demand request may include, for example, a flow size, an average packet size, QoS handling, an expected duration, DCCP-required services, and a list of locations.

Network layer control device 140 may include one or more network devices, or other types of computation or communication devices, to manage network resources for network 100. In one implementation, network layer control device 140 may include a communication interface with PCE 120 to receive notification of a network soft-state to support a flow demand request (e.g., submitted from a service operator via service layer control device 130) when it is determined that a particular data center can support the flow demand.

Endpoints 150 may include one or more computing devices, network devices, other types of computation or communication devices, or a network of devices (e.g., a LAN) that receive a flow from one of data centers 110. For example, a flow may include streaming video (e.g., a movie) that can be presented by endpoint 150 or distributed to multiple other devices.

Network 160 may generally include a wide area network (WAN), a metropolitan area network (MAN), a wireless network, an optical fiber (or fiber optic)-based network, a cable television network, a satellite television network, or a combination of networks. In one implementation, network 160 may include an Internet Protocol (IP)-based network supporting MPLS protocols. In some implementations, network 160 may be a private network controlled by, for example, a telecommunications company that provides television, telephone, and/or data access to endpoints 150. In another implementation, network 160 may be a public network, such as the Internet, or a combination of public and private networks.

In operation, if unplanned load-balancing occurs in network 100 between data centers 110 (e.g., due to a local outage, for example) without a direct network layer tie-in, a large flow or set of flows that shows up in a different location can overwhelm circuits, especially if the network operator utilizes Resource Reservation Protocol-Traffic Engineering (RSVP-TE) with preset bandwidth allocations. Even in cases where RSVP auto-bandwidth allocator is used, migrating flows between data centers 110 can cause short-term congestion or, in worst cases, cause disruptive RSVP churn. In cases where data centers 110 represent a content distribution network or cloud-computing services, large shifts of traffic could result in a step function increase that would be aberrant and unpredictable to traffic trend analyses (Time of Day, Day of Week, seasonal, etc.).

In implementations described herein, service layer control device 130 may provide flow demand requests to one or more PCE 120 to request flow size, average packet size, QoS handling, expected duration, DCCP-required services, and/or a list of locations for a flow (e.g., a flow migrating from one data center 110 to another data center 110). PCE 120 may receive the flow demand request and interact with network elements 115, endpoints 150, and/or network 160 to build a soft-state prior to admitting the flow.

The exemplary configuration illustrated in FIG. 1 is provided for simplicity. It should be understood that a typical network may include more or fewer devices than illustrated in FIG. 1. For example, network 100, may include dozens of data centers 110 and/or endpoints 150. In addition, network 100 may include additional elements, such as switches, gateways, routers, etc., that aid in routing data. Also, various functions are described below as being performed by particular components in network 100. In other implementations, various functions described as being performed by one device may be performed by another device or multiple other devices, and/or various functions described as being performed by multiple devices may be combined and performed by a single device.

Figure 2:
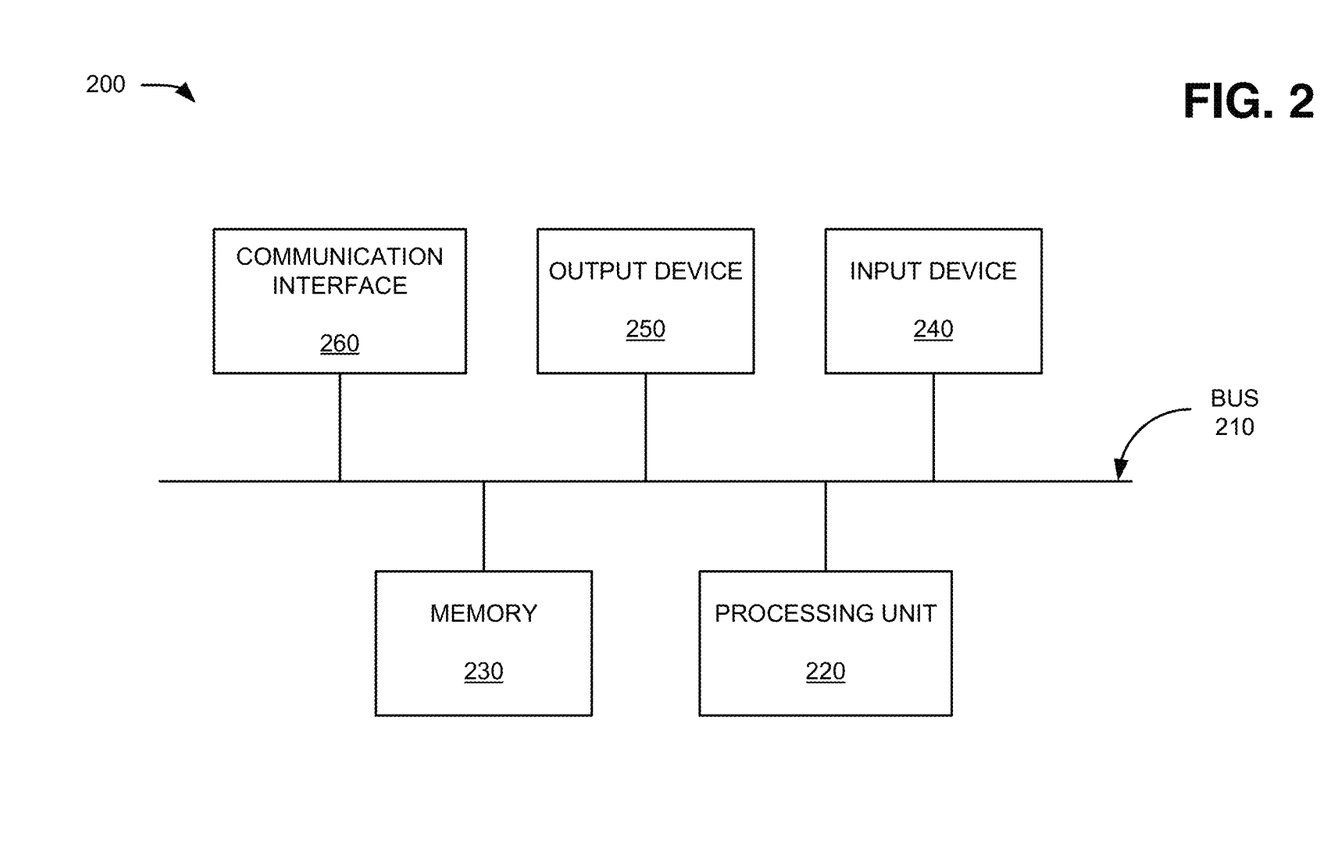
FIG. 2 is a diagram of an exemplary components of one or more of the devices of the network depicted in FIG. 1.

FIG. 2 is a diagram of example components of a device 200 that may correspond to any one of the components of network 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage medium that stores information and instructions for execution by processing unit 220, a read only memory (ROM) or another type of static storage medium that stores static information and instructions for processing unit 220, and/or some other type of magnetic or optical recording medium and its corresponding drive for storing information and/or instructions.

Input device 240 may permit an operator to input information to device 200, such as a keyboard, a keypad, a mouse, a pen, a microphone, one or more biometric mechanisms, and the like. Output device 250 may output information to the operator, such as a display, a speaker, etc.

Communication interface 260 may include any transceiver (e.g., a transmitter and/or receiver) that enables device 200 to communicate with other devices and/or systems. For example, communication interface 260 may include mechanisms for communicating with other devices, such as other components of network 200.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
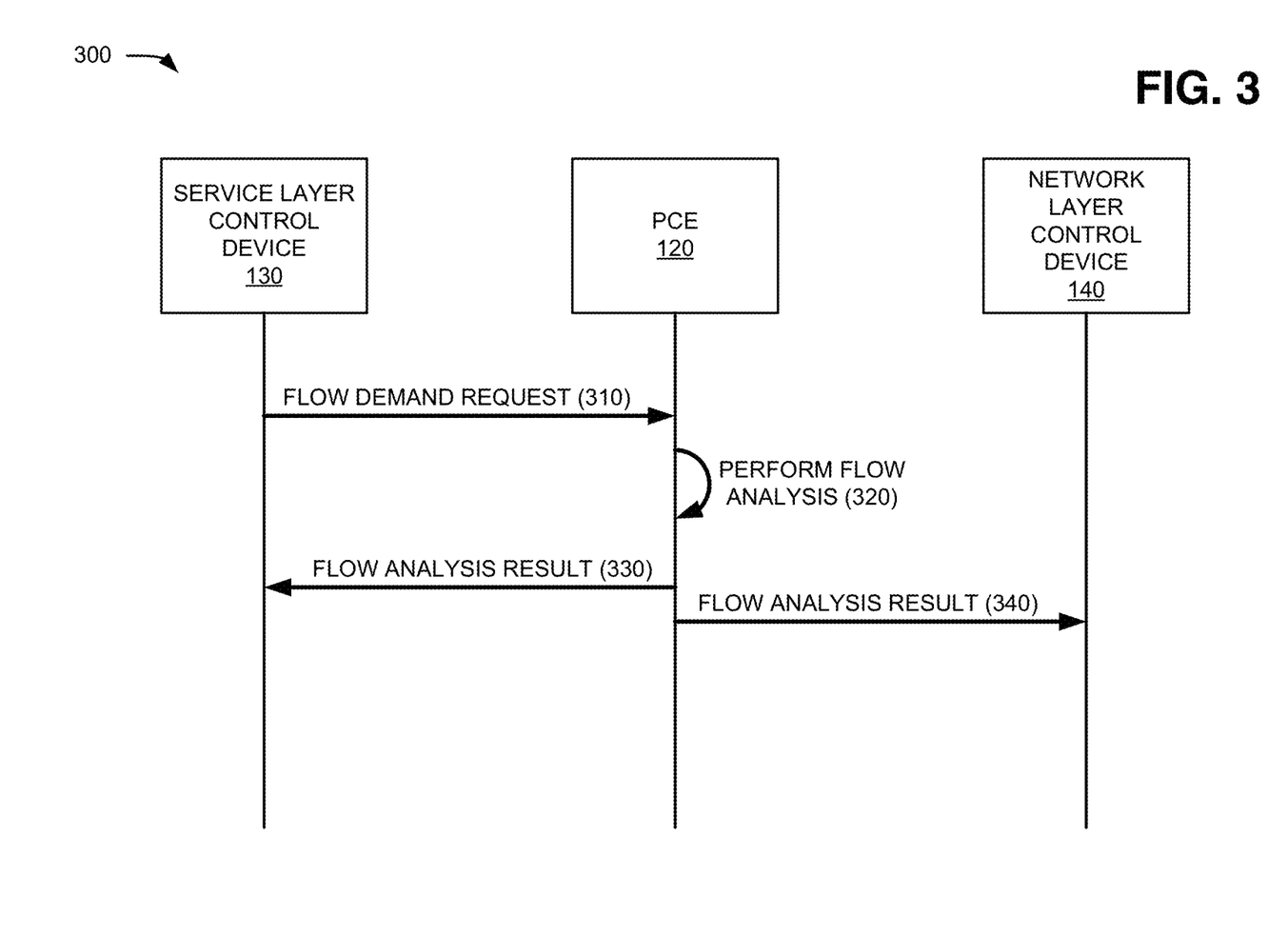
FIG. 3 is a diagram of exemplary communications among a portion of the network of FIG. 1.

FIG. 3 is a diagram of exemplary communications among a portion 300 of network 100. Network portion 300 may include PCE 120, service layer control device 130, and network layer control device 140. PCE 120, service layer control device 130, and network layer control device 140 may include features described above in connection with FIGS. 1 and 2.

As shown in FIG. 3, service layer control device 130 may provide a flow demand request 310 to PCE 120. The flow demand request may include criteria for a new flow or set of flows. For example, service layer control device 130 may receive instructions from a service operator to off-load existing flows from one data center (e.g., data center 110-1) to another data center (e.g., data center 110-2). In one implementation, service layer control device 130 may solicit (e.g., from a service operator via a user interface) a list of specifications to formulate flow demand request 310, such as flow size, an average packet size, QoS handling, an expected duration, and a list of locations. Service layer control device 130 may assemble flow demand request 310 and forward flow demand request 310 to PCE 120.

PCE 120 may receive flow demand request 310 and, in response, may perform a flow analysis 320. For example, PCE 120 may interact with network elements 115 to build a soft-state (e.g., simulated links that may include one or more individual links or link aggregation (LAG) bundles as defined per IEEE 802.3ad) for flow demand request 310 to determine if the selected data center 110 can meet the specifications of flow demand request 310. In one implementation, PCE 120 may first run an instance examining capacity of the virtual machine (e.g., running on network elements 115) to provide and/or relay content, then examine relevant the LAN resources, and then the WAN to determine if they are sufficient to support the flow demand.

In one implementation, flow analysis 320 may include a radial demand analysis for a proposed migration of a set of flows from a current data center (e.g., data center 110-1) to another selected data center (e.g., data center 110-2). As used herein the term "radial demand analysis" may include an analysis of a projected flow impact from the selected data center to multiple endpoints (e.g., endpoint 150). The multiple endpoints may include, for example, local hubs, LANs, market centers, or end user locations. In one implementation of performing a radial demand analysis, PCE 120 may model a subset of links from the selected data center 110 to particular endpoints. For example, PCE 120 may model links from data center 110 to the ten (or another configured number) largest markets, links with over ten percent (or another configured percentage) of the total flow size, or another limiting criteria. In another implementation, PCE 120 may model all or a subset of links against a particular latency threshold (e.g., 2 ms or another configured value). Based on the modeled paths, PCE 120 may determine whether flow demand request 310 can be accepted. For example, acceptance criteria may require that all modeled links from data center 110 to the ten largest markets or that all links with more than ten percent of the total flow size be capable of carrying the flow at the flow demand specifications.

Based on flow analysis 320, PCE 120 may provide a flow analysis result 330 to service layer control device 130 and/or a flow analysis result 340 to network layer control device 140. Flow analysis result 330 may include, for example, admitting flow demand request 310, denying flow demand request 310, or a proposing an alternate data center for flow demand request 310. For example, if all of the soft-state links in a modeled subset support the specifications in flow demand request 310, flow analysis result 330 (e.g., from PCE 120 to service layer control device 130) may include a positive response to flow demand request 310. Flow analysis result 340 (e.g., from PCE 120 to network layer control device 140) may include similar information, and PCE 120 may hold (e.g., reserve resources for) the soft-state in the network until an operator of network layer control device 140 approves/denies the flow demand request 310.

Conversely, if any of the soft-state links from the selected data center 110 cannot support the specifications in flow demand request 310, PCE 120 may deny flow demand request 310 or may seek an alternate data center 110 that can support flow demand request 310. For example, if one or more of the soft-state links in a modeled subset do not support the specifications in flow demand request 310, flow analysis result 330 (e.g., from PCE 120 to service layer control device 130) may include a negative response to flow demand request 310. Additionally, or alternatively, if the selected data center cannot support flow demand request 310, PCE 120 may perform a flow analysis for one or more another data centers 110 (e.g., a next closest data center 110 to the selected data center 110) to determine if another data center 110 can support flow demand request 310. If PCE 120 determines that another data center 110 can support flow demand request 310, PCE 120 may include in flow analysis result 330 (e.g., from PCE 120 to service layer control device 130) the suggested alternate data center.

PCE 120 may also provide the suggested alternate data center in flow analysis result 340 (e.g., from PCE 120 to network layer control device 140), and hold a soft-state for the alternate data center 110 in the network while an operator of network layer control device 140 gates flow demand request 310 for the alternate data center 110.

Figure 4:
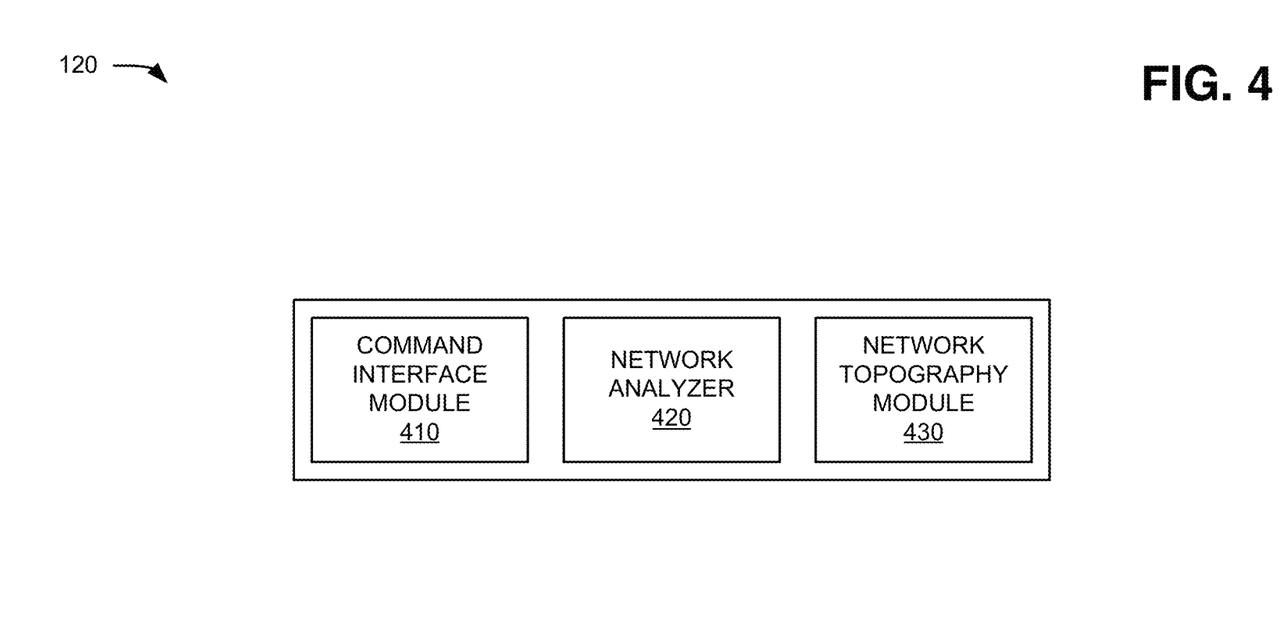
FIG. 4 is a diagram of exemplary functional components of the path computation element of FIG. 1.

FIG. 4 is a diagram of exemplary functional components of PCE 120. In one implementation, the functions described in connection with FIG. 4 may be performed by one or more components of device 200 (FIG. 2), such as a dedicated resource, an virtual machine instance within a device/device subsystem, or a virtual machine instance spanning multiple devices 200. As shown in FIG. 4, PCE 120 may include a command interface module 410, a network analyzer 420, and a network topography module 430.

Command interface module 410 may receive commands from service layer control device 130 and report results to service layer control device 130 and/or network layer control device 140. For example, command interface module 410 may receive a flow demand request (e.g., flow demand request 310) from service layer control device 130 that includes request to implement a flow at a selected data center, along with criteria for the flow. Command interface module 410 may parse the flow demand request and forward the flow demand request to network analyzer 420.

Network analyzer 420 may perform flow analysis for the flow demand request. For example, network analyzer 420 may evaluate, based on the collected network topology information received from network topography module 430, the flow demand for the selected data center to determine if the selected data center can support the flow demand. In one implementation, network analyzer 420 may compute a soft-state to support the requested flow based on real-time network data. In another implementation, network analyzer 420 may simulate a soft-state computation based on stored data. If network analyzer 420 determines that the selected data center can support the flow demand, network analyzer 420 may send to a network layer operator (e.g., network layer control device 140) the network soft-state to support the flow demand at the selected data center.

In evaluating the flow demand, network analyzer 420 may first determine if the data center has sufficient resources to support the flow(s) in the flow demand request. For example, network analyzer 420 may determine a number of endpoints in the flow demand request and/or current resources to determine if the flow demand can be supported by data center 110. If the resources of data center 110 are sufficient, network analyzer 420 may examine the LAN resources associated with either endpoint for the link (e.g., the selected data center 110 and the destination endpoint 150). If the LAN resources are sufficient to support the flow demand, network analyzer 420 may examine the WAN resources between the endpoints. If the WAN resources are deemed sufficient, the end-to-end link may be accepted.

In one implementation, network analyzer 420 may automatically seek an alternate data center 110 if a selected data center 110 fails to support a flow demand. For example, network analyzer 420 may identify a next-closest (e.g., geographically) data center to the selected data center and conduct a similar evaluation of the flow demand request for the alternate data center. If the next-closest data center also fails to support the flow demand, network analyzer 420 may repeat the evaluation on other alternate data centers until a suitable data center is found, or until a maximum number of iterations (e.g., a particular number configured by an operator) is achieved. If network analyzer 420 determines that an alternate data center can support the flow demand, network analyzer 420 may send to a network layer operator (e.g., network layer control device 140) the network soft-state to support the flow demand at the alternate data center.

In another implementation, network analyzer 420 may also model cost requirements. For example, in a Private Internet Protocol (PIP) network, network engineers may define costs or metrics of routing paths to achieve better network performance (e.g., to improve latency). Network analyzer 420 may receive cost information from network topography module 430. Based on information included in flow demand requests 310, network analyzer 420 may account for routing costs when evaluating particular links. For example, services with higher margins could request more expensive paths. Similarly, reliability and/or stability data may be factored into the analysis by network analyzer 420.

Network topography module 430 may collect network data and store the network topography data for use by network analyzer 420. In one implementation, network topology module 430 may track real-time information of network 100 using event notifications that carry data specifying events that affect the network topology or capacity of network 100.

Although FIG. 4 shows exemplary functional components of PCE 120, in other implementations, PCE 120 may include fewer functional components, different functional components, differently-arranged functional components, and/or additional functional components than depicted in FIG. 4. Alternatively, or additionally, one or more functional components of PCE 120 may perform one or more tasks described as being performed by one or more other functional components of PCE 120.

Figure 5:
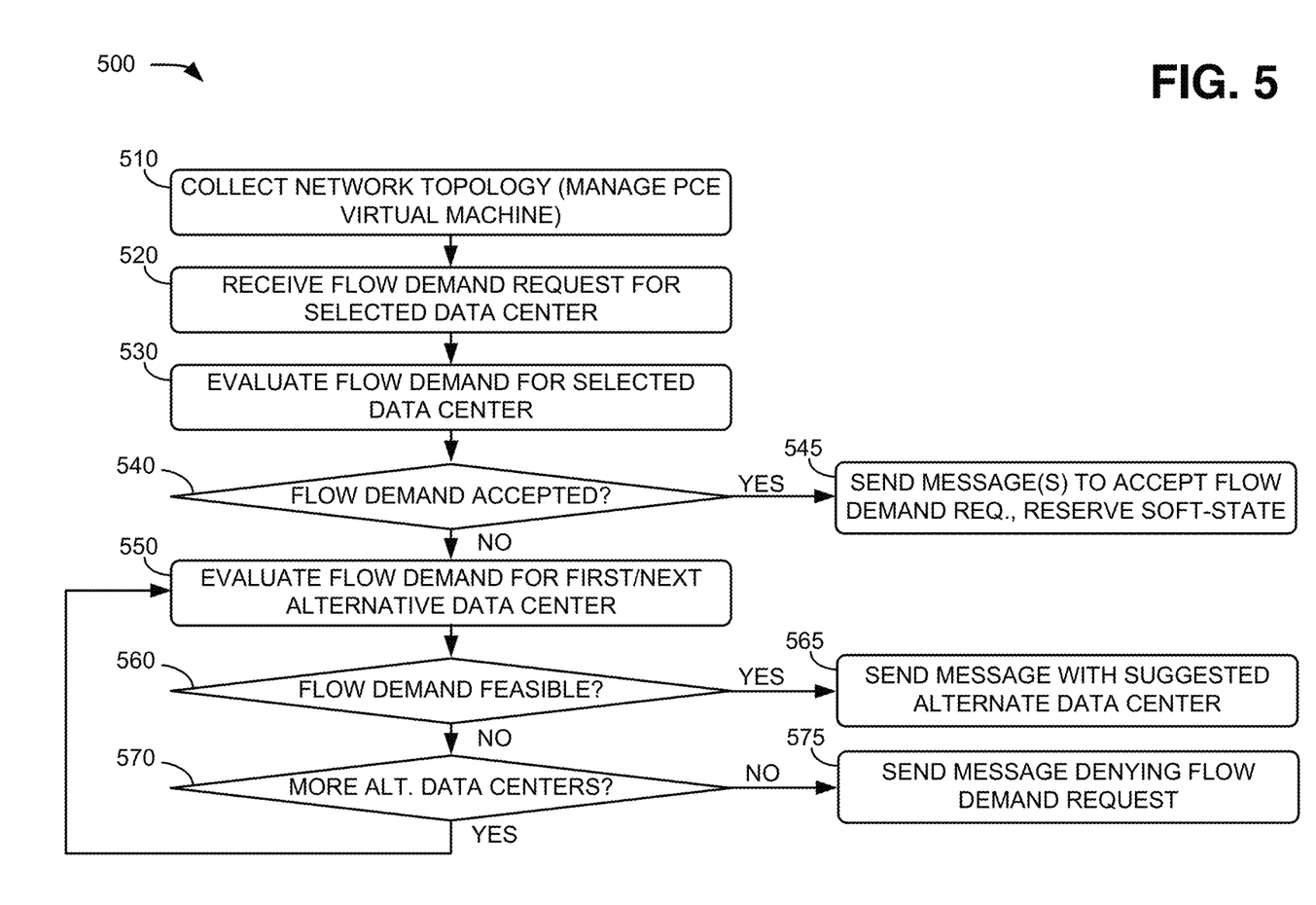
FIGS. 5 and 6 are flow charts of an exemplary process for performing call admission control for MPLS sessions according to an implementation described herein.
Figure 6:
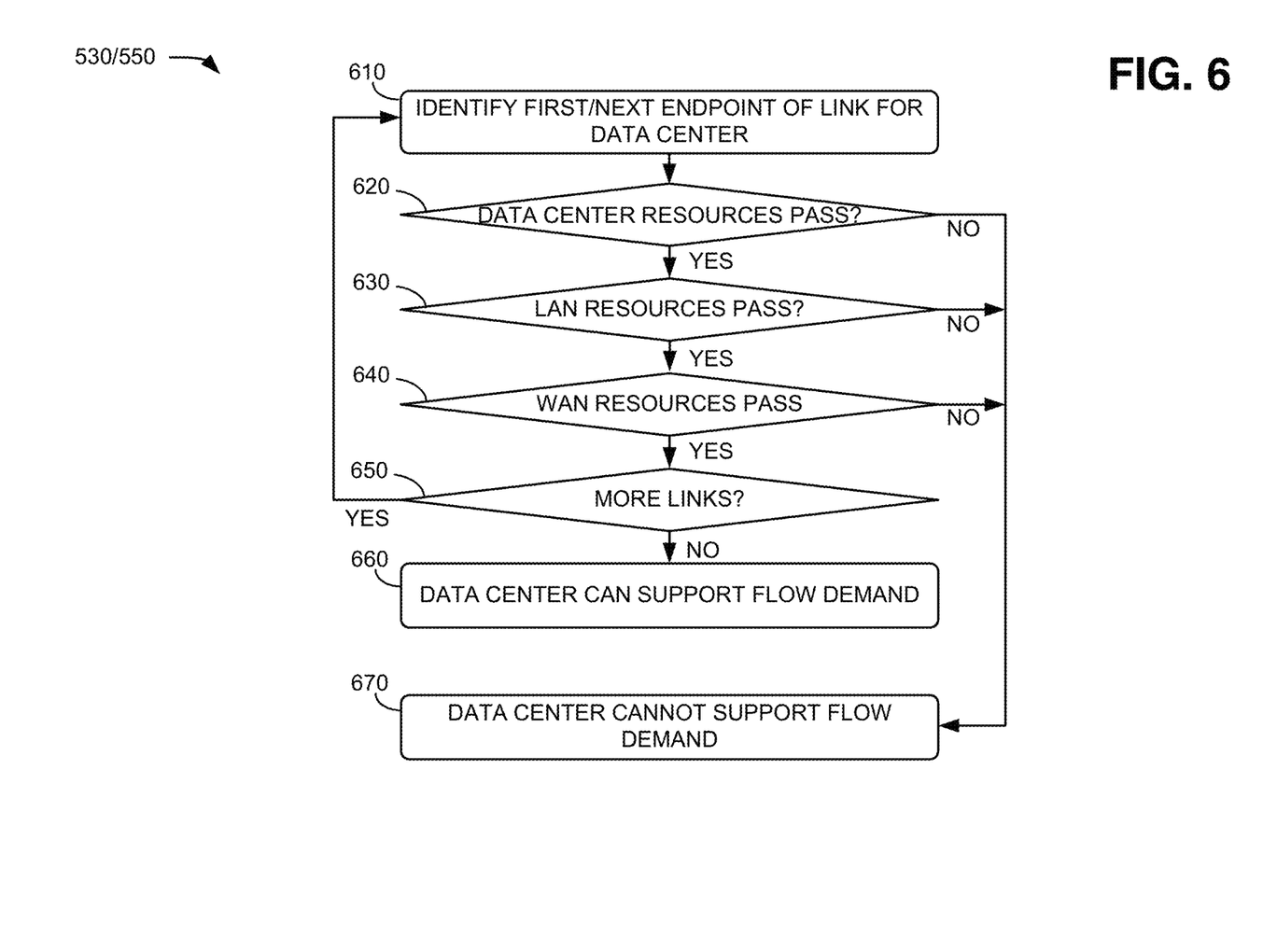

FIGS. 5 and 6 are flowcharts of an exemplary process 500 for performing call admission control for MPLS sessions according to an implementation described herein. In one implementation, process 500 may be performed by PCE 120. In another implementation, some or all of process 500 may be performed by another device or group of devices, including or excluding PCE 120.

As illustrated in FIG. 5, process 500 may include collecting network topology (block 510) and receiving a flow demand request (block 520). For example, PCE 120 (e.g., network topography module 430) may collect/store network topology information including data from event notifications. Service layer control device 130 may provide a flow demand request 310, which may be received by PCE 120 (e.g., command interface module 410). The flow demand may include, for example, a flow size, an average packet size, QoS handling, an expected duration, DCCP-required services, and a list of locations.

As further shown in FIG. 5, process 500 may include evaluating a flow demand request for a selected data center (block 530) and determining if the flow demand can be accepted (block 540). For example, PCE 120 (e.g., network analyzer 420) may perform flow analysis for the flow demand request. PCE 120 may evaluate, based on the collected network topology information, the flow demand for the selected data center to determine if the selected data center can support the flow demand.

If the flow demand request is accepted (block 540—YES), process 500 may include sending one or more messages to accept the flow demand request and reserving the soft-state (block 545). For example, if PCE 120 (e.g., network analyzer 420) determines that the selected data center can support the flow demand, PCE 120 may send to a network layer operator (e.g., network layer control device 140) the network soft-state to support the flow demand at the selected data center. PCE 120 may hold the soft-state in the network while an operator of network layer control device 140 gates flow demand request 310.

If the flow demand request is not accepted (block 530—NO), process 500 may include evaluating the flow demand for a first alternative data center (block 550) and determining if the first alternate flow demand is feasible (block 560). For example, if the selected data center cannot support flow demand request 310, PCE 120 (e.g., network analyzer 420) may perform a flow analysis for one or more another data centers 110 (e.g., a next closest data center 110 to the selected data center 110) to determine if another data center 110 can support flow demand request 310.

If the first alternate flow demand is feasible (block 560—YES), process 500 may include sending a message with the suggested alternate data center (block 565). For example, if PCE 120 (e.g., network analyzer 420) determines that an alternate data center can support the flow demand, PCE 120 may send to a network layer operator (e.g., network layer control device 140) the network soft-state to support the flow demand at the alternate data center.

If the first alternate flow demand is not feasible (block 550—NO), process 500 may include determining if additional alternative data centers are available (block 570). For example, If the next-closest data center also fails to support the flow demand, PCE 120 (e.g., network analyzer 420) may repeat the evaluation on other alternate data centers until a suitable data center is found, or until a maximum number of iterations (e.g., a particular number configured by an operator) is achieved.

If additional alternative data centers are available (block 570—YES), process 500 may return to block 550 to build a soft-state for the next alternative data center. If no alternative data centers are available (block 570—NO), process 500 may send a message denying the flow demand request (block 575). For example, if none of the alternative data centers support the specifications in a flow demand request (e.g. flow demand request 310), PCE 120 (e.g., network analyzer 420) may provide a negative response to the flow demand request.

Process blocks 530 and 550 may include the process blocks depicted in FIG. 6. As shown in FIG. 6, process blocks 530/550 may include identifying a first/next endpoint of a link for a data center (block 610). For example, PCE 120 (e.g., network analyzer 420) may identify, based on a flow demand request, an endpoint location for the flow. The endpoint may include, for example, a local hub, a LAN, a market center, or an end user location (e.g., endpoint 150).

Process blocks 530/550 may further include determining if data center (VM) resources are sufficient (block 620). For example, PCE 120 (e.g., network analyzer 420) may first determine if data center 110 has sufficient resources to support the flow(s) in the flow demand request. If the data center resources are not sufficient (block 620—NO), PCE 120 may determine that the selected data center 110 cannot support the flow demand (block 670).

If the data center resources are sufficient (block 620—YES), it may be determined if LAN resources at each endpoint of the link are sufficient (block 630). For example, PCE 120 (e.g., network analyzer 420) may determine if resources of the LAN endpoints (e.g., individual link or LAG endpoints) are sufficient to support the new flow. LAN resources to be evaluated may include virtual LAN (VLAN) bandwidth, remaining free subnet address space, Data Center Bridging (DCB)/Priority Flow Control (PFC) capabilities, fibre channel over Ethernet (FCOE)/Fibre Channel (FC) gateway, jumbo frame support, Virtual Private LAN Service (VPLS) support, equal-cost multi-path (ECMP) routing support, and best path calculations using Transparent Interconnection of Lots of Links (TRILL) or other proprietary implementations of Intermediate System To Intermediate System (IS-IS) protocol. Also, similar information to WAN topologies can be conveyed in modified IS-IS/TRILL type-length values ((TLVs), such as least cost, most stable, least delay, IEEE 802.1p codepoints, etc.). If the LAN resources are not sufficient (block 630—NO), PCE 120 may determine that the selected data center 110 cannot support the flow demand (block 670).

If the LAN resources are sufficient (block 630—YES), it may be determined if WAN resources between the endpoints of the link are sufficient (block 640). For example, PCE 120 (e.g., network analyzer 420) may evaluate information from network topography module 430 to determine if resources such as central office hub, optical fibers, etc. have capacity to support the requested flow (e.g., based on the flow size, average packet size, quality of service (QoS) handling, expected duration, DCCP-required services, and/or a list of locations included in the flow demand). If the WAN resources are not sufficient (block 640—NO), PCE 120 may determine that the selected data center 110 cannot support the flow demand (block 670).

If the WAN resources are sufficient (block 640—YES), it may be determined if there are more links to be examined (block 650). If there are more links to be examined (block 650—YES), then the process may return to block 610 to identify a next link for the selected data center. If there are no more links to be examined (block 650—NO), it may be determined that the selected data center can support he flow demand (block 660). For example, PCE 120 (e.g., network analyzer 420) may iteratively work though each link, or a particular subset of links, for the flow demand request until all links are verified.

Figure 7A:
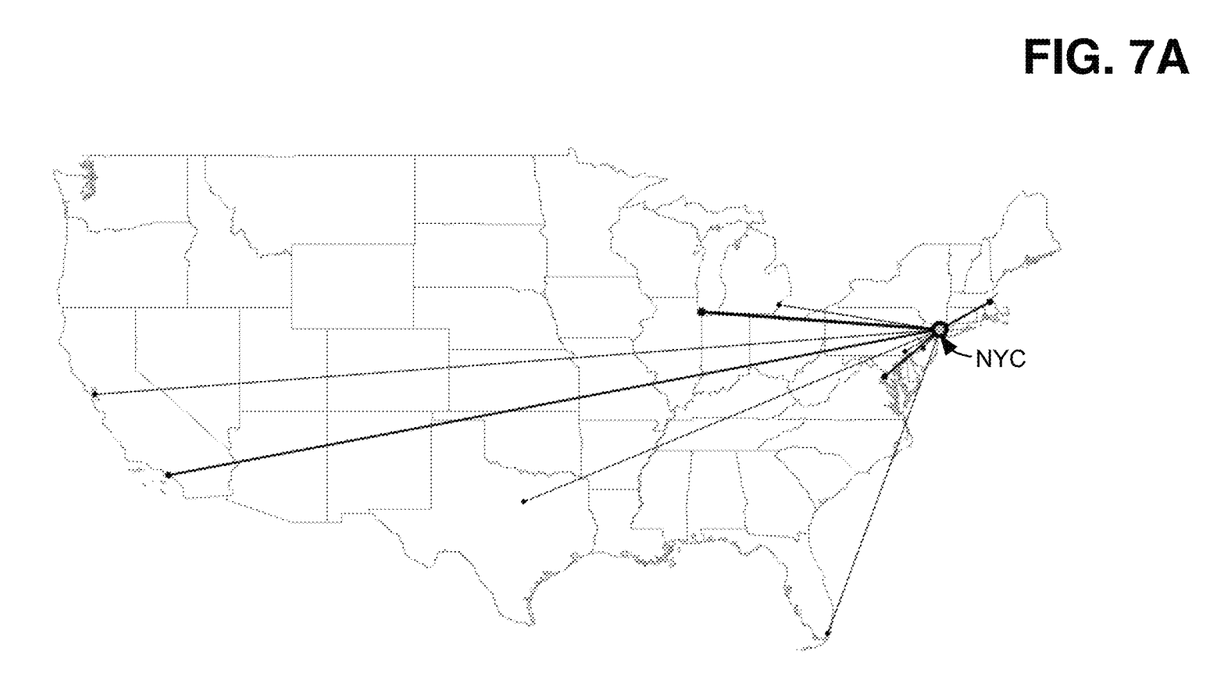
FIGS. 7A-7D are diagrams of an exemplary use case according to an implementation described herein.

FIGS. 7A-7D are diagrams of a use case of radial demand modeling according to an implementation described herein. As shown in FIG. 7A, assume a system operator determines a need (e.g., due to a local services issue) to shift a set of flows for a streaming media service originating out of a data center (e.g., data center 110, not shown) in New York City. The system operator initiates a flow demand request (e.g., flow demand request 310) to off-load flows from the streaming media server in New York City to a data center in Washington, D.C. A PCE (e.g., PCE 120) with access to the network topology of the Washington, D.C. data center may receive the flow demand request and conduct a radial demand model of the primary paths from the Washington, D.C. data center to support the streaming media flow (e.g., using methods described above in connection with FIGS. 5 and 6).

Figure 7B:
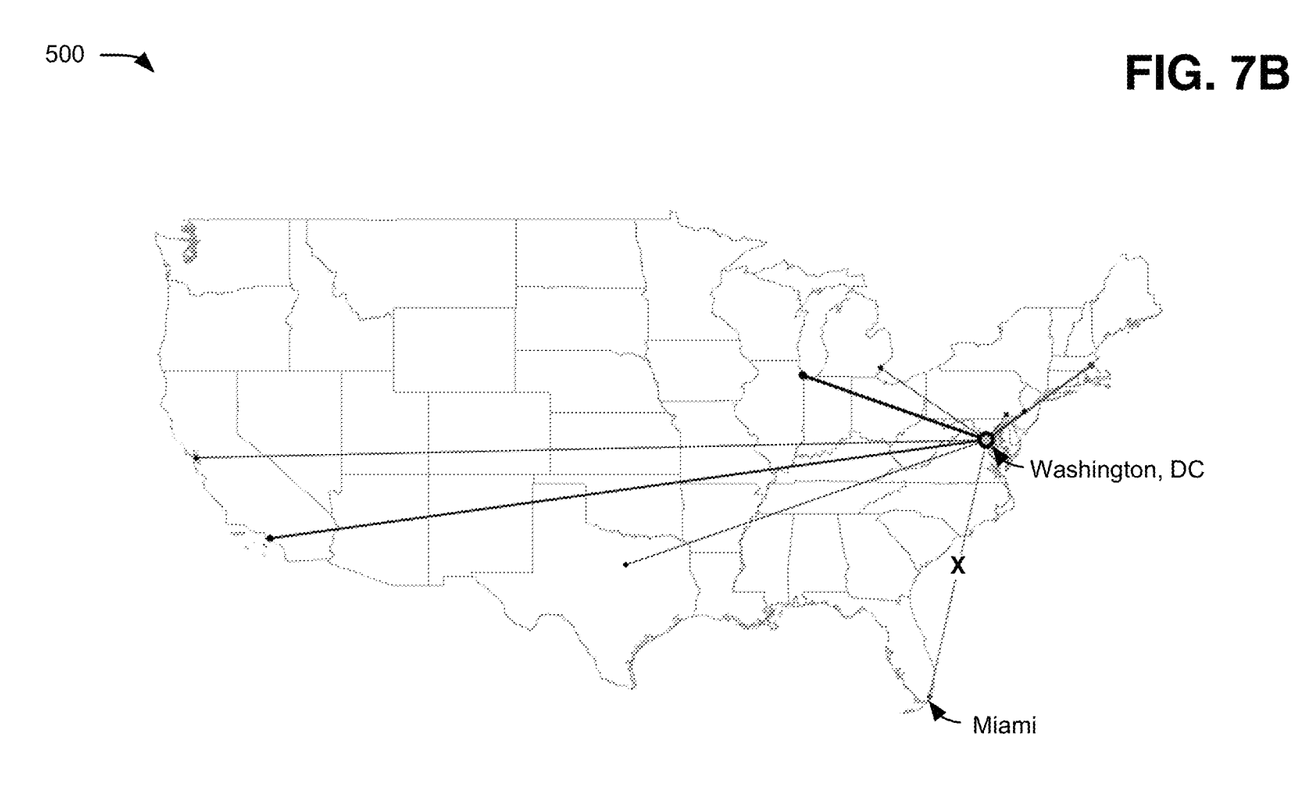
Figure 7C:
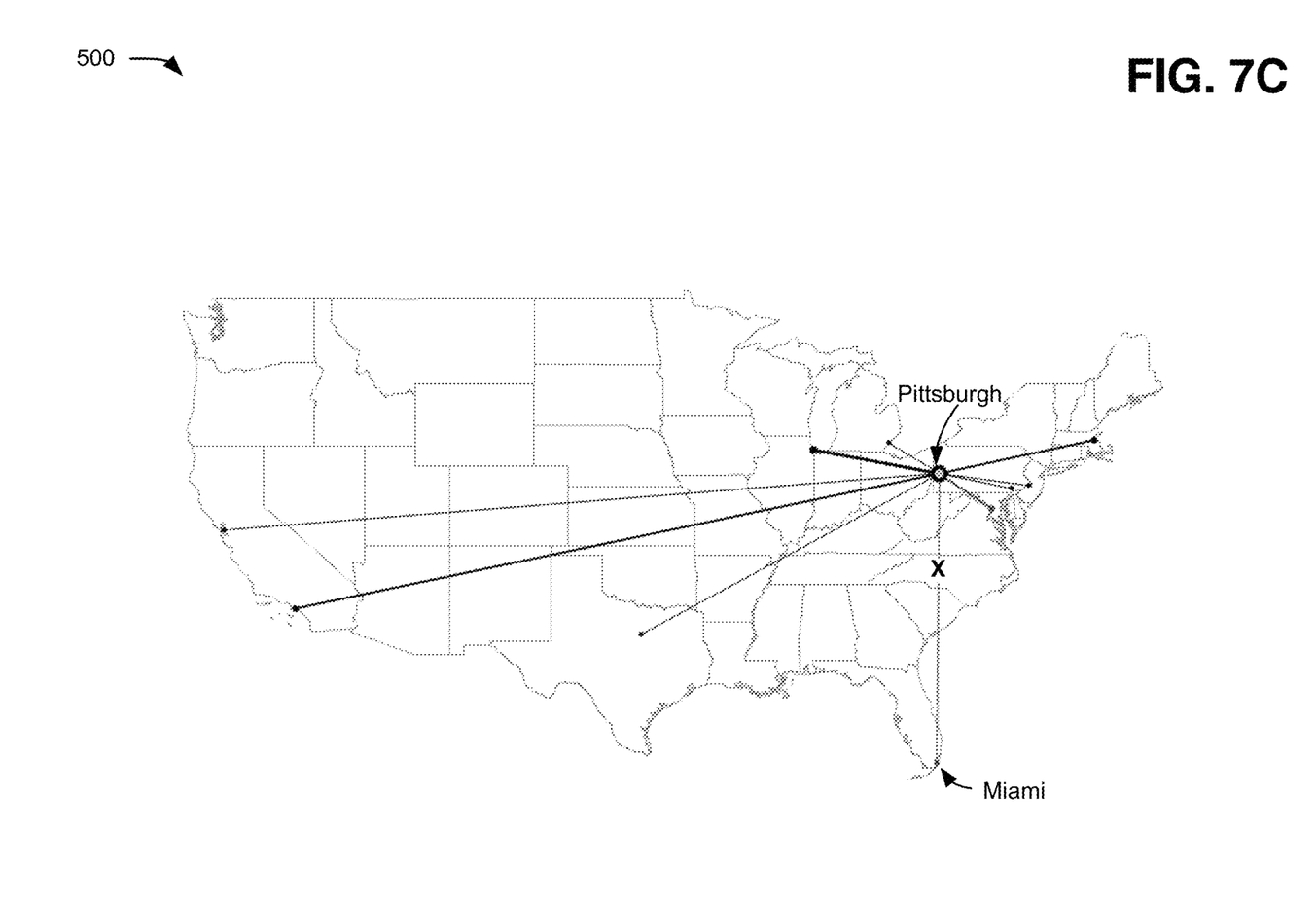
Figure 7D:
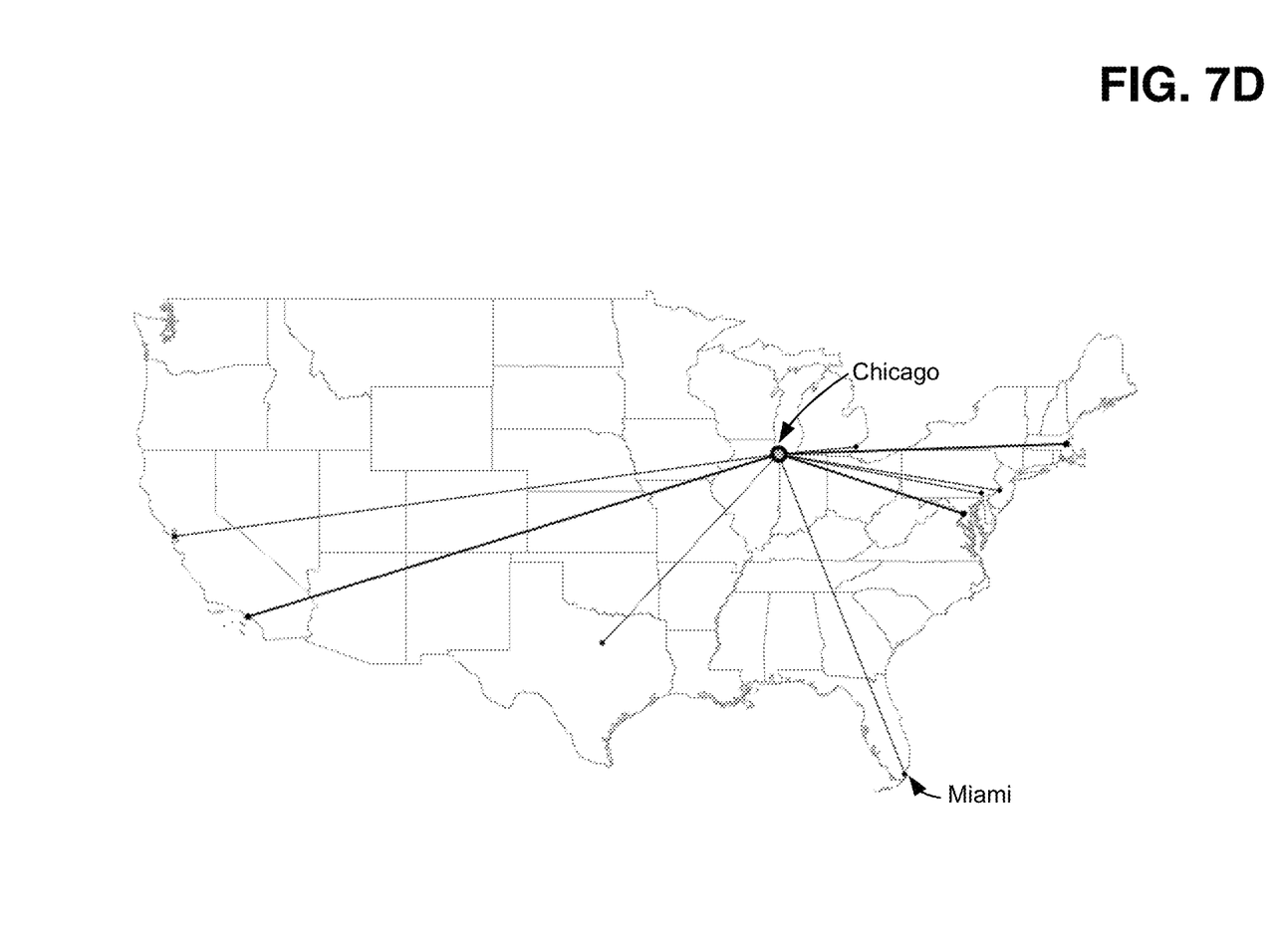

Assume (as shown in FIG. 7B) one or more links from the Washington, D.C. data center (e.g., Washington, D.C. to Miami) fails to support the flow demand. The PCE may deem the Washington, D.C. data center as 'failed' and identify a next closest data center (e.g., Pittsburgh) on which to perform a similar analysis. Assume (as shown in FIG. 7C) one or more links from the Pittsburgh data center (e.g., Pittsburgh to Miami) fails to support the flow demand. The PCE may then identify a next nearest data center (e.g., Chicago) and repeat the radial demand analysis for that data center. As shown in FIG. 7D, the radial demand model for the Chicago data center provides adequate support for the flow demand. PCE 120 may send a response to a network operator to deny the flow demand request for the Washington, D.C. data center and to provide the Chicago data center as an alternative. PCE 120 may also send a message to the services operator to note the Chicago data center is the closest data center that can support the flow demand request. PCE 120 may hold the soft-state for the Chicago data center until the flow demand is accepted/rejected by, for example, the network operator.

Systems and/or methods described herein may provide call admission control for the service of adding flows to data centers, such as a data centers in a cloud-based service or a content distribution network. The systems and/or methods may receive, from a service layer operator, a request including a flow demand for services at a selected data center. If it is determined that the selected data center can support the flow demand, the systems and/or methods may send to a network layer operator, a network soft-state to support the flow demand at the selected data center. If it is determined that the selected data center cannot support the flow demand, the systems and/or methods may deny the request or may identify an alternate data center to support the flow demand.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. Further, while series of acts have been described with respect to FIGS. 5 and 6, the order of the acts may be varied in other implementations. Moreover, non-dependent acts may be implemented in parallel. Additionally, other processes described in this description may be varied and/or acts performed in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   collecting, by one or more computing devices, real-time network topology information for a Multiprotocol Label Switching (MPLS) network that includes multiple data centers for a content delivery system or a cloud-based computing service;
   receiving, by the one or more computing devices and from a service layer control device, a request including a flow demand for migrating a set of flows from a current data center to a selected data center of the multiple data centers;
   evaluating, by the one or more computing devices and based on the collected network topology information, the flow demand for the selected data center to determine if the selected data center can support the flow demand, wherein the evaluating includes examining local area network resources at either end of a link between the selected data center and a link endpoint for capacity to support specifications in the flow demand, evaluating if the one or more computing devices has sufficient resources to support specifications in the flow demand, examining wide area network resources between the selected data center and the link endpoint for capacity to support the specifications in flow demand, and
   wherein the local area network resources include remaining free subnet address space and Data Center Bridging (DCB)/Priority Flow Control (PFC) capabilities; and
   sending, by the one or more computing devices and to a network layer control device, a network soft-state to support the flow demand at the selected data center when the selected data center can support the flow demand, wherein the network soft-state represents a set of available network resources reserved to support the flow demand prior to admitting a flow corresponding to the flow demand.

2. The method of claim 1, further comprising:
   determining, based on the evaluating, that the selected data center cannot support the flow demand;
   identifying, based on the collected network topology information, an alternate data center of the multiple data centers;
   evaluating the flow demand for the alternate data center to determine if the alternate data center can support the flow demand; and
   sending, to the network layer control device, a network soft-state to support the flow demand at the alternate data center, wherein the network soft-state to support the flow demand at the alternate data center represents a set of available network resources reserved to support the flow demand at the alternate data center.

3. The method of claim 1, further comprising:
   sending, to the service layer control device, an approval message for the flow demand request.

4. The method of claim 1, further comprising:
   reserving resources for the network soft-state to support the flow demand at the selected data center until a response is received from the network layer control device.

5. The method of claim 1, further comprising:
   storing the network topology information; and
   updating the network topology information.

6. The method of claim 1, wherein the evaluating includes modeling a subset of links, from the selected data center to a discrete set of endpoints in the MPLS network, associated with the flow demand.

7. The method of claim 6, wherein the discrete set of endpoints includes:
   endpoints receiving ten percent or more of a total amount of the flow demand,
   a particular number of largest markets to be served by the flow demand, or
   a particular number of largest recipient endpoints to be served by the flow demand.

8. The method of claim 6, wherein the evaluating includes modeling costing requirements for the subset of links to the discrete set of endpoints.

9. The method of claim 1, wherein the request including a flow demand is a request to migrate the flow from the current data center of the multiple data centers to the selected data center, and wherein the request includes:
   a flow size,
   an average packet size,
   quality of service (QoS) handling requirements,
   an expected duration, and a list of endpoint locations serviced by the current data center.

10. The method of claim 1, further comprising:
sending, to the service layer control device, an indication that the request including the flow demand has been denied when the selected data center cannot support the flow demand.

11. A network device, comprising:
a memory configured to store instructions; and
a processor configured to execute instructions in the memory to:
obtain network topology information for a Multiprotocol Label Switching (MPLS) network;
receive, from a services control device, a request with a flow demand for migrating a set of flows from a current data center to a selected data center in the MPLS network, wherein the request includes a flow size, an average packet size, an expected duration, and a list of endpoint locations;
evaluate, based on the network topology information, the flow demand for the selected data center to determine if the selected data center can support the flow demand,
wherein the evaluating includes examining local area network resources at either end of a link between the selected data center and a link endpoint for capacity to support specifications in the flow demand,
wherein the local area network resources include remaining free subnet address space and Data Center Bridging (DCB)/Priority Flow Control (PFC) capabilities, and
wherein the evaluating further includes modeling flows, based on the flow demand, for link aggregation groups (LAGs) between the selected data center and multiple endpoints identified in the list of endpoint locations; and
send, to a network layer control device, a network soft-state to support the flow demand at the selected data center when the selected data center can support the flow demand, wherein the network soft-state represents a set of available network resources reserved to support the flow demand prior to admitting a flow corresponding to the flow demand.

12. The network device of claim 11, wherein the processor is further configured to:
determine, based on evaluating of the selected data center, that the selected data center cannot support the flow demand;
identify, based on the collected network topology information, an alternate data center in the MPLS network;
evaluate, the flow demand for the alternate data center to determine if the alternate data center can support the flow demand; and
send, to the network layer control device, a network soft-state to support the flow demand at the alternate data center, wherein the soft-state represents a set of available network resources reserved to support the flow demand.

13. The network device of claim 11, wherein the processor is further configured to:
hold the network soft-state to support the flow demand at the selected data center until a response is received from the network layer control device.

14. The network device of claim 11, wherein, when modeling the flows for the LAGs, the processor is further configured to:

evaluate if the selected data center has sufficient resources to support the flow demand;
examine local area network resources for the selected data center and a first endpoint of the multiple endpoints;
examine wide area network resources between the selected data center and the first endpoint of the multiple endpoints; and
determine that the selected data center can support the flow demand between the selected data center and the first endpoint of the multiple endpoints before examining local area network resources for the selected data center and a second endpoint of the multiple endpoints.

15. The network device of claim 11, wherein the selected data center is one of multiple data centers within:
a content delivery network, or
a cloud-based service system.

16. The network device of claim 11, wherein the network device comprises:
a router,
a network management station, or
a virtual machine.

17. A non-transitory computer-readable medium, including instructions executable by at least one processor, the computer-readable medium comprising one or more instructions for:
receiving, from a service layer control device, a request including a flow demand for services at a selected data center of a Multiprotocol Label Switching (MPLS) network,
wherein the request includes a request to mi rate a flow from a current data center of multiple data centers to the selected data center, and
wherein the request includes a flow size, an average packet size, an expected duration, and a list of endpoint locations;
first evaluating the flow demand for the selected data center to determine if the selected data center can support the flow demand,
wherein the first evaluating includes examining first local area network resources at either end of a link between the selected data center and a link endpoint for capacity to support specifications in the flow demand, wherein the first local area network resources include remaining free subnet address space and Data Center Bridging (DCB)/Priority Flow Control (PFC) capabilities;
determining, based on the evaluating of the selected data center, that the selected data center cannot support the flow demand;
identifying an alternate data center of the MPLS network;
second evaluating the flow demand against the alternate data center to determine if the alternate data center can support the flow demand, wherein the second evaluating includes examining second local area network resources at either end of a link between the alternate data center and a link endpoint for capacity to support the specifications in the flow demand, and wherein the second local area network resources include remaining free subnet address space and DCB/PFC capabilities; and
sending, to a network layer control device, a network soft-state to support the flow demand at the alternate data center when the alternate data center can support the flow demand, wherein the network soft-state represents a set of available network resources reserved to support the flow demand prior to admitting a flow corresponding to the flow demand.

18. The non-transitory computer-readable medium of claim 17, further comprising one or more instructions for:
holding the network soft-state to support the flow demand at the alternate data center until a response is received from the network layer control device.

19. A method, comprising:
collecting, by one or more computing devices, real-time network topology information for a Multiprotocol Label Switching (MPLS) network that includes multiple data centers for a content delivery system or a cloud-based computing service;
receiving, by the one or more computing devices and from a service layer control device, a request including a flow demand for migrating a set of flows from a current data center to a selected data center of the multiple data centers,
wherein the request including a flow demand is a request to migrate the flow from the current data center of the multiple data centers to the selected data center, and wherein the request includes a flow size, an average packet size, quality of service (QoS) handling requirements, an expected duration, and a list of endpoint locations serviced by the current data center;
evaluating, by the one or more computing devices and based on the collected network topology information, the flow demand for the selected data center to determine if the selected data center can support the flow demand,
wherein the evaluating includes examining local area network resources at either end of a link between the selected data center and a link endpoint for capacity to support specifications in the flow demand, and
wherein the local area network resources include remaining free subnet address space and Data Center Bridging (DCB)/Priority Flow Control (PFC) capabilities; and
sending, by the one or more computing devices and to a network layer control device, a network soft-state to support the flow demand at the selected data center when the selected data center can support the flow demand, wherein the network soft-state represents a set of available network resources reserved to support the flow demand prior to admitting a flow corresponding to the flow demand.

20. The method of claim 19, wherein the evaluating includes modeling a subset of links, from the selected data center to a discrete set of endpoints in the MPLS network, associated with the flow demand.

* * * * *